INVENTOR.
SYLVESTER R. CUDNOHUFSKY
BY
Barnes, Kisselle, Raisch & Choate
ATTORNEYS

United States Patent Office 3,170,376
Patented Feb. 23, 1965

3,170,376
HYDRAULIC POSITIONING MEANS
Sylvester R. Cudnohufsky, 3650 Lapeer Road,
Pontiac, Mich.
Filed June 21, 1961, Ser. No. 118,665
12 Claims. (Cl. 91—22)

This invention relates to hydraulic positioning means and more specifically to a device for accurately and positively stopping a table or other movable component of a machine tool at a predetermined position.

In many machining operations, it is required to locate a table-supported work piece in an accurately predetermined position relative to a cutting tool so that a particular configuration, such as a groove or the like, can be machined on the work piece at an accurately determined location. The device of the present invention is designed for use with a hydraulically operated table or other movable component of a machine tool for locating the table or other component in one or more accurately predetermined positions relative to the base of the machine tool.

It is an object of the present invention to provide a hydraulically controlled positioning or locating means for a machine tool which is highly accurate in its operation.

A further object of the invention resides in the provision of a hydraulically operated and controlled positioning means for a machine tool which is designed to accurately locate a table or other movable component in an accurately predetermined position and hold it in said position regardless of any leakage which normally occurs in conventional hydraulic systems.

Figure 1:
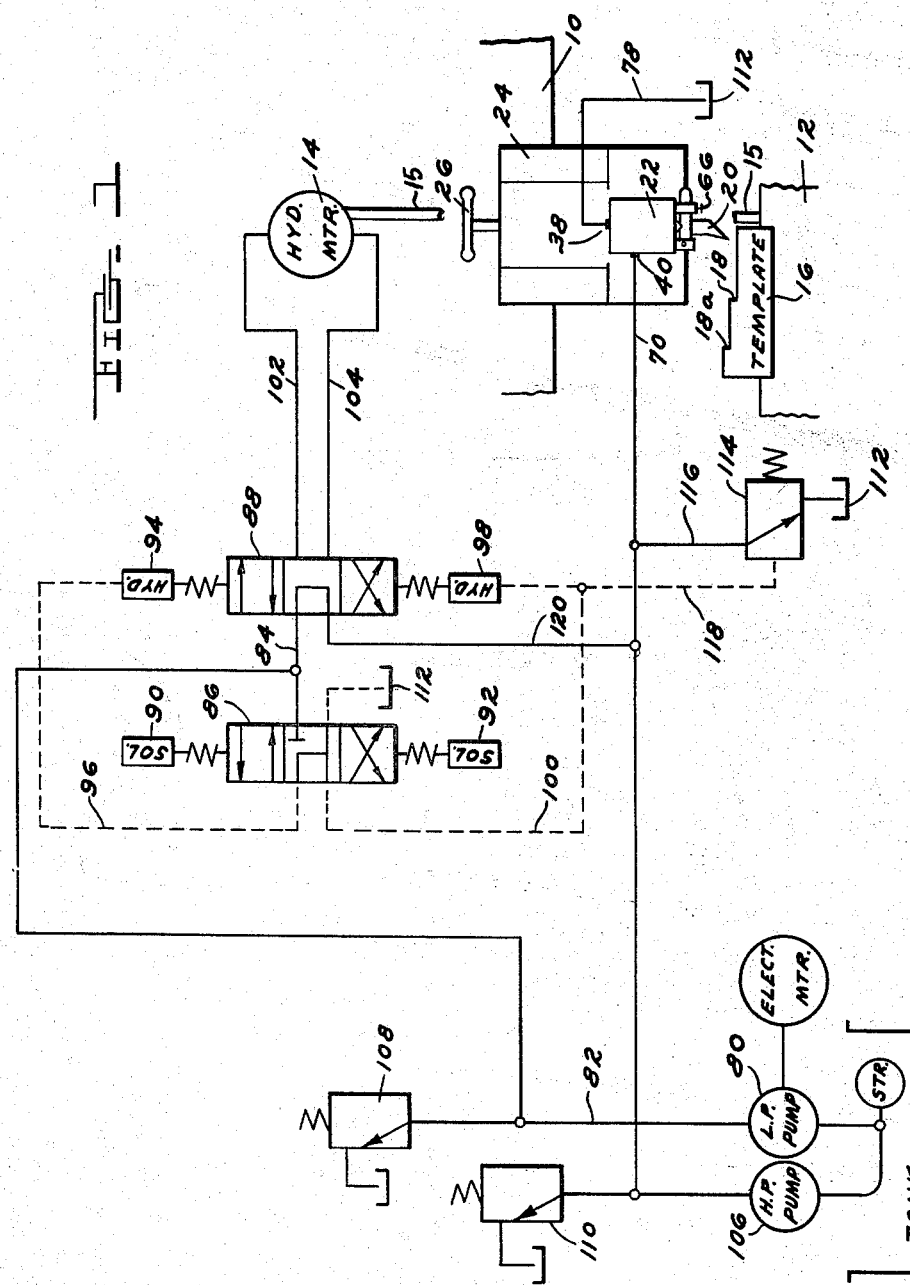
FIG. 1 is a diagrammatic view of the control circuit of the hydraulic positioning means of the present invention, the valves being shown in the positions assumed when the circuit is energized and running idly.

In the drawings, the base or bed of a machine tool is illustrated at 10 and the table which is movably mounted on base 10 is designated 12. Table 12 can be arranged to reciprocate or rotate on base 10 as is conventional and the driving means for the table comprises a hydraulic motor 14. Motor 14 may take the form of a conventional piston-cylinder assembly or a rotary type hydraulic motor in accordance with the design preferred or desired. In the drawings, motor 14 is illustrated as a rotary type motor mounted on base 10 and connected to table 12 by a suitable drive 15.

A template 16 is fixedly mounted on table 12. Template 16 is provided with one or more steps or stop shoulders 18, 18a which, when the table is actuated in the direction toward the right as viewed in the drawings, are adapted to engage the stylus 20 of a control valve 22 mounted on the base 10 of the machine. Valve 22 is mounted for reciprocation on a slide 24 fixedly mounted on the machine. Valve 22 is arranged to be reciprocated in a direction generally perpendicular to the direction of travel of the table so that the stylus 20 of the valve can be located in or out of the path of movement of shoulders 18, 18a on template 16. For purposes of illustration, the valve 22 is shown actuated by a screw controlled by a handwheel 26. If desired, valve 22 can be arranged to reciprocate on slide 24 by means of a piston-cylinder assembly.

Figure 4:
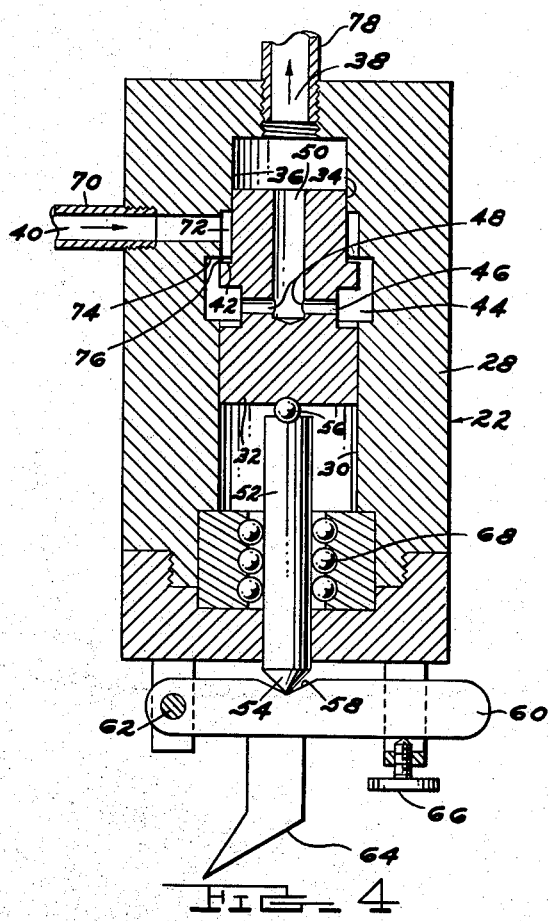
FIG. 4 is a semi-diagrammatic sectional view of the control valve.

Referring now to FIG. 4, the control valve 22 is there illustrated. This control valve includes a valve body 28 provided with a bore 30. Within bore 30, there is arranged a piston 32, one end of which is reduced as at 34. The reduced end 34 of piston 32 reciprocates in a smaller diameter bore portion 36 which communicates with an outlet port 38 on the valve body. The inlet port 40 communicates with bore 30 at one side of a shoulder 42 formed on piston 32. The portion of bore 30 extending circumferentially around shoulder 42 is enlarged as at 44 while the portion of the piston 32 adjacent the enlarged portion 44 of the bore is of reduced diameter as indicated at 46. A series of radially extending passageways 48 in piston 32 establish communication between the enlarged bore portion 44 and the axially extending passageway 50 in piston 32. Passageway 50 opens into the reduced bore portion 36 and thereby communicates with the outlet port 38. A plunger 52 extending axially of bore 30 has one end 54 projecting out an end of valve body 12 and its other end engaging the end face of piston 32 through a bearing ball 56. The end 54 of plunger 52 is conically shaped as illustrated and engages within a notch 58 formed in a lever 60 pivoted on valve body 28 as at 62. Lever 60 has a stylus 64 projecting therefrom. An adjusting screw 66 is provided for limiting the extent to which plunger 52 is permitted to project outwardly of valve body 28. Plunger 52 is guided for free axial movement by a bearing 68.

The operation of control valve 22 can be briefly described as follows:

When oil is admitted to inlet 40 through line 70, the oil flows into chamber 72 surrounding piston 32 and in view of the fact that the shoulder 42 cooperates with the shoulder 74 at the enlarged portion 44 of bore 30 to form an annular orifice 76 of relatively small size, the pressure of the oil in line 70 is exerted against shoulder 42 to bias the piston 16 axially in bore 30 in a direction urging plunger 52 outwardly such that lever 60 engages adjusting screw 66. The oil passing through orifice 76 flows into the enlarged bore portion 44, then through the radial passageways 48 through the axial passageway 50 in piston 32 and out of the valve through outlet port 38 and line 78. It will be observed that when lever 60 is pivoted in a counterclockwise direction as viewed in FIG. 4, the restriction at orifice 76 is increased and the back pressure thereby produced is exerted in line 70.

Pressurized hydraulic fluid for operating motor 14 is supplied by a pump 80. Pump 80 may be referred to as a low pressure pump capable of developing a relatively low, substantially constant pressure of, for example, 400 to 500 pounds per square inch and at said pressure, capable of delivering from about five to ten gallons of oil per minute. A hydraulic line 82 extends from the outlet of pump 80 to a line 84 which interconnects the inlet ports of two valves 86 and 88. Valve 86 is a pilot valve of the spring centered, solenoid operated type and valve 88 is a directional valve pilot operated by valve 86. Directional valve 88 is a four-way valve of the spring centered, hydraulically operated type. Pilot valve 86 is a four-way valve of the conventional type which includes two solenoids 90 and 92 for shifting the spool of the valve in opposite directions. One of the operating cylinders 94 of valve 88 is connected with valve 86 by a pilot oil line 96 and the other cylinder 98 of valve 88 is connected with valve 86 by a pilot oil line 100.

Figure 2:
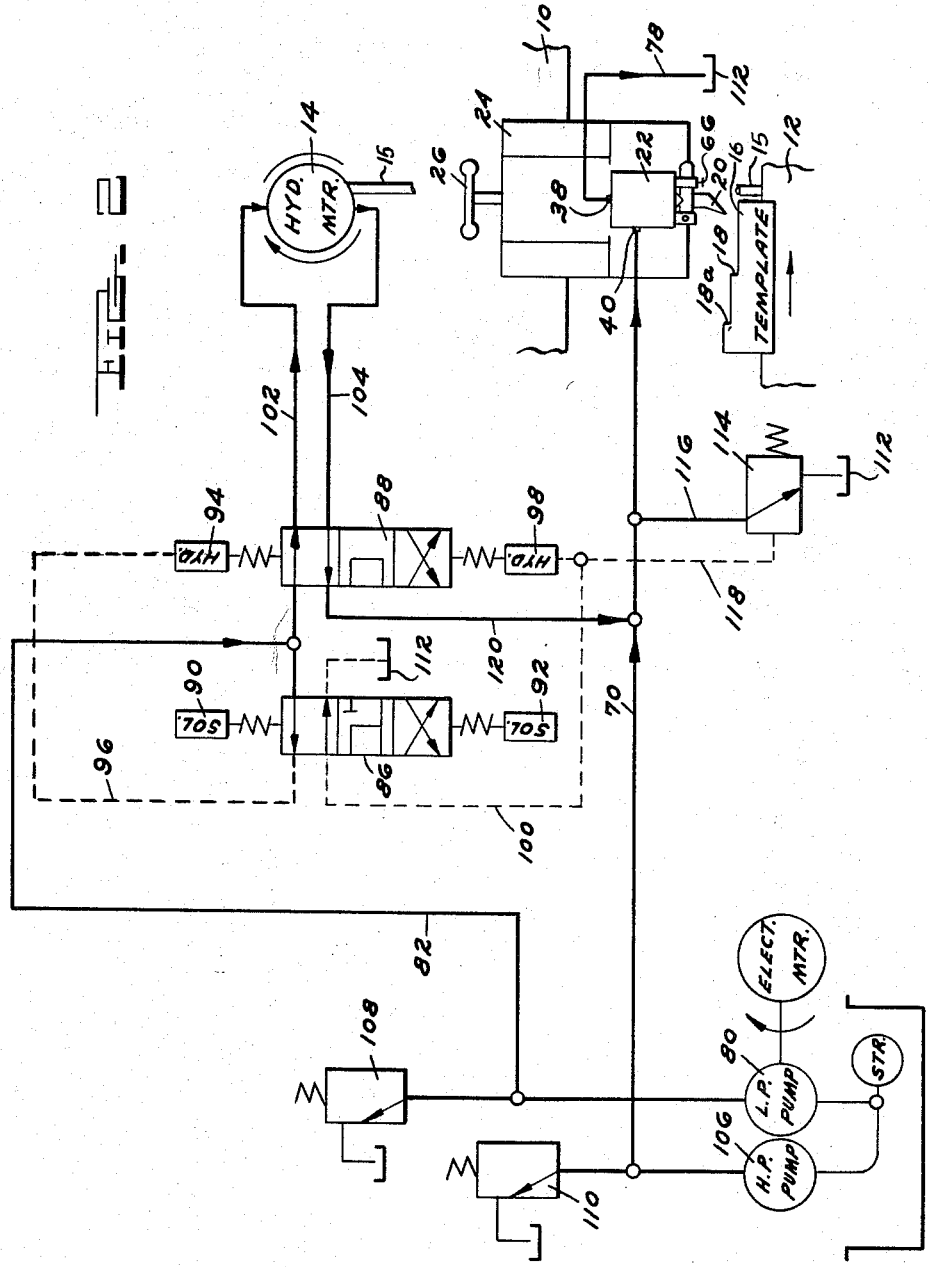
FIG. 2 is a view similar to FIG. 1 showing the control circuit conditioned to cause the table of the machine tool and the template thereon to approach the stylus of the control valve.
Figure 3:
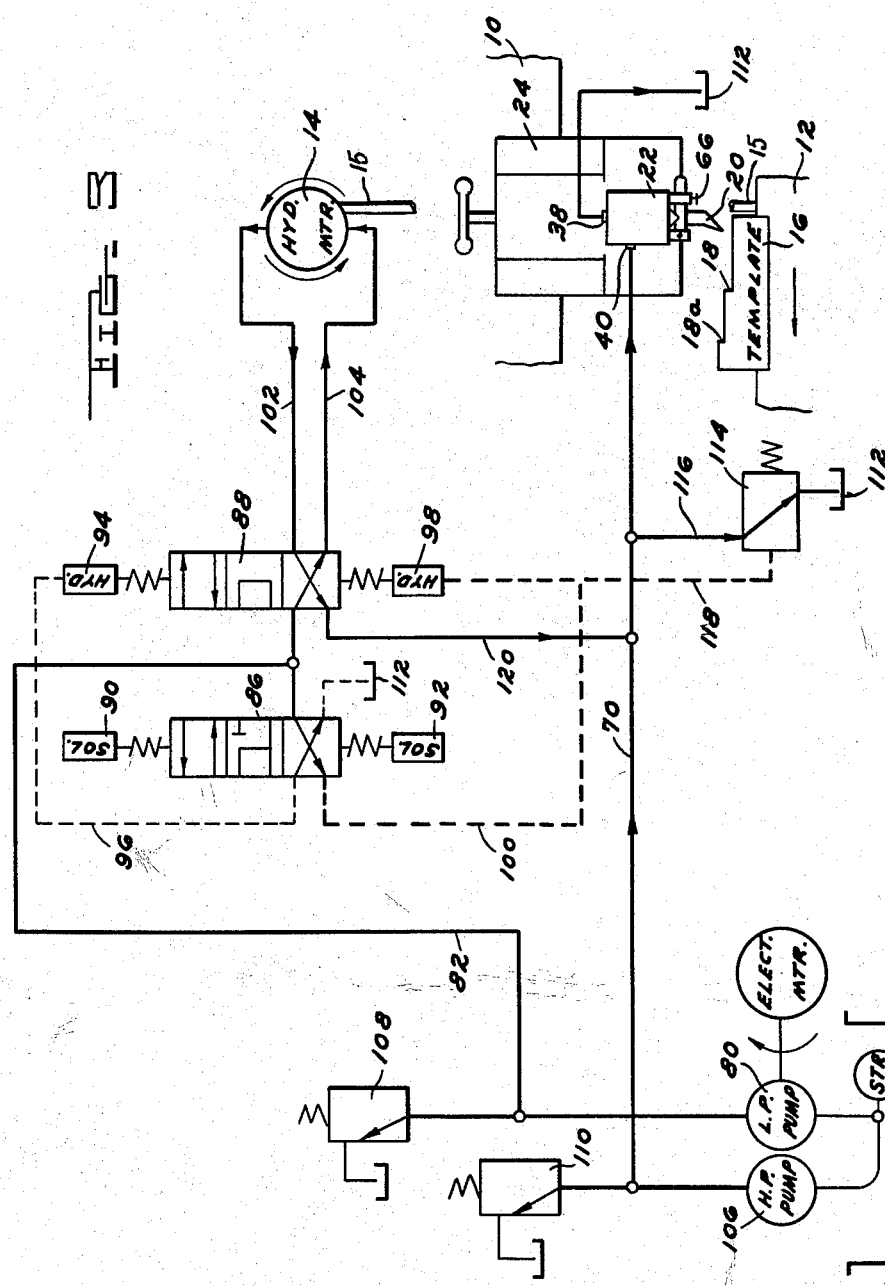
FIG. 3 is a view similar to FIG. 1 showing the control circuit conditioned for rapid return or retraction of the table and template mounted thereon in a direction away from the control valve.

For the purpose of simplification, the pilot oil lines in the drawings are shown as broken lines while the actual oil flow lines of the control circuit are shown in solid lines. Furthermore, the oil lines which are operative in particular portions of the cycle illustrated in FIG. 2 and 3 are shown in heavy lines and the oil lines which may be considered as idle are shown in light lines.

The inlet and outlet ports of hydraulic motor 14 are connected with directional valve 88 by lines 102 and 104 respectively. The inlet line 70 for control valve 22 connects with the outlet port of a pump 106. Pump 106 is referred to as the high pressure pump and is capable of instantaneously developing a relatively high pressure of, for example, one thousand pounds per square inch with a capacity of about one gallon per minute. The maximum pressures developed in lines 82 and 70 are controlled by relief valves 108 and 110, respectively, which are connected into these lines. The exhaust line 78 from control valve 22 connects with sump as at 112. A pilot operated spring return unloading valve 114 is connected with line 70 as by line 116. The pilot oil line of valve 114 is designated 118 and connects with pilot oil line 100 so that valve 114 is responsive to the pressure in hydraulic cylinder 98. Valve 114 dumps to sump at 112.

In FIG. 1, the circuit is shown in the idle condition with the solenoids of valve 86 deenergized and the stylus 20 of valve 22 out of engagement with the shoulders or steps 18, 18a on the template 16. The oil from low pressure pump 80 circulates freely through lines 82, 84, the tandem center of valve 88 through lines 120 and 70, through valve 22 and to sump. The degree of restriction at orifice 76 at this time is controlled exclusively by the setting of adjusting screw 66.

Assuming that a cutting tool is mounted on base 10 of the machine and that a work piece is mounted on the table 12 (or vice versa), the work piece and cutting tool are relatively adjusted so that when the first shoulder 18 on template 16 engages the stylus of valve 22, the work piece is properly located with respect to the cutting tool so that a desired machining operation can be performed at a desired location on the work piece. For example, it may be desired to form a pair of grooves around a cylindrical work piece. In this case, the two shoulders 18, 18a would be spaced apart on template 16 a distance corresponding to the desired spacing between the two grooves and the template 16 would be adjusted on the table 12 so that when the first shoulder 18 engages the stylus 20, the work piece would be located in relation to the cutting tool so as to form the first groove thereon at the proper location on the work piece.

With the control circuit operating idly as shown in FIG. 1, when it is desired to advance the table to a position for performing the first machining operation, a start switch is depressed which energizes solenoid 90 of pilot valve 86. Oil from the low pressure pump 80 thus flows through line 82, through the pilot line 96 to actuate cylinder 94 and thus shift directional valve 88 to the position shown in FIG. 2. Oil from low pressure pump 80 is thus admitted to the inlet port of hydraulic motor 14 through the inlet line 102. The oil exhausting from motor 14 flows through the outlet line 104, through valve 88 and line 120 and emerges with the oil flowing from high pressure pump 106. However, in view of the fact that in this condition of the circuit, the degree of restriction at valve 22 is relatively slight, the pressure of the oil in lines 120 and 70 is relatively low. The table 12 through the operation of motor 14 is thus caused to travel in the direction indicated by the arrow in FIG. 2 so that the template 16 approaches the stylus 20 of valve 22. The speed of table travel in the template approach direction is determined by the setting of adjusting screw 66 of valve 22 and the capacity of the low pressure pump 80. As adjusting screw 66 is advanced to increase the restriction at orifice 76, the back pressure in lines 70, 120 and 104 is increased and the speed of motor 14 is thereby reduced. When the shoulder 18 on template 16 engages stylus 20, lever 60 is pivoted in a counterlockwise direction as viewed in FIG. 4, thus causing retraction of plunger 52 and immediate greater restriction at orifice 76. As the restriction at orifice 76 becomes greater, the pressure in the high pressure line 70, in the exhaust line 104 and branch line 120 immediately increases. When the restriction at orifice 76 is such that the back pressure in lines 70, 120 and 104 reaches a value equal to the driving force on motor 14, the motor stops and movement of table 12 is arrested. Stated differently, when the restriction in valve 22 increases to an extent such that the pressure in line 70 developed by the high pressure pump 106 builds up to a value such that the pressure in line 104 an dthe load on the table 12 balances the pressure developed in line 102 by the low pressure pump 80, motor 14 stops. It will be appreciated that with the arrangement shown, the restriction at orifice 76 increases very rapidly when stylus 20 is engaged by shoulder 18 on template 16 and the pressure built up in lines 70, 120 and 104 occurs substantially immediately. Thus, the table movement can be arrested at a very accurately predetermined location. In this connection, it should be pointed out that with this arrangement, there is no tendency for the table to drift. If the pressure on the high side of the system has a tendency to overbalance the pressure on the low side of the system, there would be an incipient reduction in restriction at orifice 76 and a consequent immediate balancing of the high and low pressure sides of this system.

The immediate response of table movement of the interengagement of one of the shoulders 18 with the stylus 20 is also attributed to the fact that the control valve 22 communicates directly with the outlet line 104 of hydraulic motor 14. Thus, the response of motor 14 to the restriction at valve 22 is substantially instantaneous. This instantaneous response of motor 14 to the degree of restriction at valve 22 prevents overtravel or "hunting" of the table.

After the first machining operation is performed, valve 22 can be retracted by rotation of hand wheel 26 (or the actuation of a hydraulic cylinder if the control valve is shifted hydraulically) to a position wherein stylus 20 clears the first shoulder 18 and lies in the path of travel of the second shoulder 18a on template 16. When this occurs, the pressure in line 70 acts against shoulder 42 on piston 32 to shift the piston downwardly as viewed in FIG. 4 and relieve the restriction at orifice 76. Hydraulic motor 14 is thereby again driven until such time as stylus 20 hits the second shoulder 18a on template 16 which again causes movement of the table 12 to be arrested. The work piece on table 12 is thus shifted relative to the cutting tool on base 10 a distance corresponding to the distance between the two shoulders 18 and the work piece is thus again located in an accurately predetermined position for the second machining operation.

One of the unique features of the control circuit disclosed herein is that the control valve 22 holds the table 12 in the desired, accurately predetermined position even though there is a normal amount of leakage of oil in the system. Normally, there is a certain amount of leakage in all hydraulic motors and in all spool valves. As long as the low pressure pump 80 has sufficient capacity to replenish leakage on the low pressure side of the system and as long as the high pressure pump 106 has sufficient capacity to replenish leakage on the high pressure side of the system, there will be no tendency for the table 12 to drift. If there were a tendency for the table to drift because of leakage, the degree of restriction at valve 22 would be immediately affected and this would be immediately offset by the pressure developed in lines 70, 120 and 104.

If table 12 is a rotary table, then the next successive work piece on the rotary table can be advanced to the proper position for the first machining operation by simply retracting valve 22 so as to disengage stylus 20 from the second shoulder or step 18a on template 16 to start the table rotating. After the stylus 20 clears template 16, valve 22 is then again shifted towards table 12 such that the stylus 20 lies in the path of movement of the first shoulder or step on the next successive template. On the other hand, if table 12 is of the reciprocating type, then the table can be returned to the starting position by deenergizing solenoid 90 and energizing solenoid 92. The operation of the control circuit with solenoid 92 energized is illustrated in FIG. 3. It will be observed that valve 86 has been shifted by solenoid 92 such that oil in the low pressure line 82 is directed through the pilot line 100 to pressurize hydraulic cylinder 98 of directional valve 88 to thereby shift the spool of the latter valve and reverse the line connections at motor 14. Thus, oil at relatively low pressure from pump 80 is directed to the motor through line 104 and is exhausted from the motor through line 102 to reverse the drive of the motor. In the arrangement illustrated, the table is permitted to return rapidly by reason of unloading valve 114. The low pressure oil in pilot line 100 flows through the pilot line 118 of valve 114 so as to shift the spool in valve 114 to a position wherein the exhaust line 116 is connected to sump as at 112. Thus, the oil flowing in lines 102, 120 and 70 is permitted to exhaust freely through valve 114 rather than being forced to pass through valve 22. If valve 114 is omitted from the circuit, then the speed of the return travel of table 12 is determined by the setting of adjusting screw 66 because in that event, the oil exhausted from the system would have to pass through valve 22.

I claim:

1. In combination, a relatively fixed member and a relatively movable member, a hydraulic motor for moving the movable member, a valve mounted on one of said members, a stop mounted on the other member, a movably mounted actuating member located in the relative path of travel of said stop, flow restricting means in said valve for variably restricting the flow therethrough, said actuating member being operably connected with said flow restricting means such that flow through the valve is responsive to the position of said actuating member, a source of relatively low pressure connected to the inlet of said hydraulic motor, a source of relatively high hydraulic pressure, a high pressure line extending from said high pressure source to said valve on the upstream side of said flow restricting means, the outlet of said motor being connected with said high pressure line, an exhaust line connected to said valve downstream of said flow restricting means, said flow restricting means being operative to restrict the flow from the high pressure line to the exhaust line and thereby increase the pressure in said high pressure line to an extent sufficient to stop said motor when said actuating member is engaged by said stop.

2. The combination called for in claim 1 wherein said actuating member is movably mounted on the valve and the degree of restriction in the valve is responsive to the extent of a movement of the actuating member.

3. The combination called for in claim 1 including means for shifting said actuating member to a position out of the relative path of travel of said stop member.

4. In a machine tool, the combination of a relatively fixed component and a relatively movable component, a hydraulic motor for moving the movable component, a valve mounted on one of said components, a stop mounted on the other component, flow restricting means in said valve for variably restricting the flow therethrough, a valve actuator associated with the valve and movable to vary the degree of restriction of said flow restricting means, a source of relatively low hydraulic pressure connected with one side of said motor, a source of relatively high hydraulic pressure, a hydraulic line extending from said high pressure source to said valve on the upstream side of said flow restricting means, the other side of said motor communicating with said hydraulic line, an exhaust line connected to said valve downstream of said flow restricting means, said actuator being located in the relative path of travel of said stop such that when said actuator engages said stop, the restriction in said valve is increased to an extent such that the back pressure in said high pressure line is sufficient to arrest movement of said motor.

5. The combination called for in claim 4 wherein said actuator is movably mounted on the valve and the degree of restriction in the valve is responsive to the extent of movement of the actuator.

6. The combination called for in claim 5 wherein the pressure in said high pressure line normally biases said actuator in a direction to reduce the restriction in said valve.

7. The combination called for in claim 6 including means for variably adjusting the position of said actuator relative to said valve to vary the maximum flow through the valve.

8. In a machine tool, the combination of a base member, a table member movable on said base member, a hydraulic motor for moving said table member, a valve mounted on one of said members and a stop mounted on the other member, said valve having a variable restrictable orifice therein, a stylus on said valve arranged to be engaged by said stop when the table is moved to a predetermined position on said base and adapted to thereby increase the restriction at said orifice, two sources of hydraulic pressure, one of said sources being capable of developing a substantially instantaneous higher pressure than the other, a feed line connecting the low pressure source with the inlet of said hydraulic motor, a feed line connecting said high pressure source with said valve on the upstream side of said restrictable orifice, said feed line having a branch line extending to the outlet of said hydraulic motor, an exhaust line connected to said valve downstream of said flow restricting means, said stylus when engaged by said stop being arranged to restrict the flow through the valve to an extent such that the pressure in said high pressure feed line and said branch line balances the driving force of the motor to arrest movement of said table.

9. The combination called for in claim 8 wherein the valve is mounted on the base member and the stop is mounted on the table member.

10. The combination called for in claim 8 wherein the valve is mounted on its respective member for movement to a position wherein the stylus is disposed out of the relative path of travel of the stop.

11. The combination called for in claim 8 including means on the valve for adjustably limiting the movement of the stylus in a direction reducing the restriction at said orifice to thereby permit varying the speed of operation of the motor when the stylus is out of engagement with the stop.

12. The combination called for in claim 8 wherein the pressure in said high pressure line tends to reduce the degree of restriction at said orifice.

References Cited in the file of this patent

UNITED STATES PATENTS

| | | |
|---|---|---|
| 1,897,350 | Wiegner | Feb. 14, 1933 |
| 2,775,235 | Jessup | Dec. 25, 1956 |